Feb. 28, 1928. 1,660,436
P. DITTMEYER
APPARATUS FOR PURIFYING WITH THE AID OF AN ENDLESS SIEVE OR RAKE BAND
WATER WHICH HAS BEEN POLLUTED BY FLOATING OR SINKING SUBSTANCES
Filed June 8, 1926 2 Sheets-Sheet 1

Inventor:
Paul Dittmeyer Deceased
By Auguste Dittmeyer Administratrix

Feb. 28, 1928.                                                1,660,436
P. DITTMEYER
APPARATUS FOR PURIFYING WITH THE AID OF AN ENDLESS SIEVE OR RAKE BAND
WATER WHICH HAS BEEN POLLUTED BY FLOATING OR SINKING SUBSTANCES
Filed June 8, 1926          2 Sheets-Sheet 2
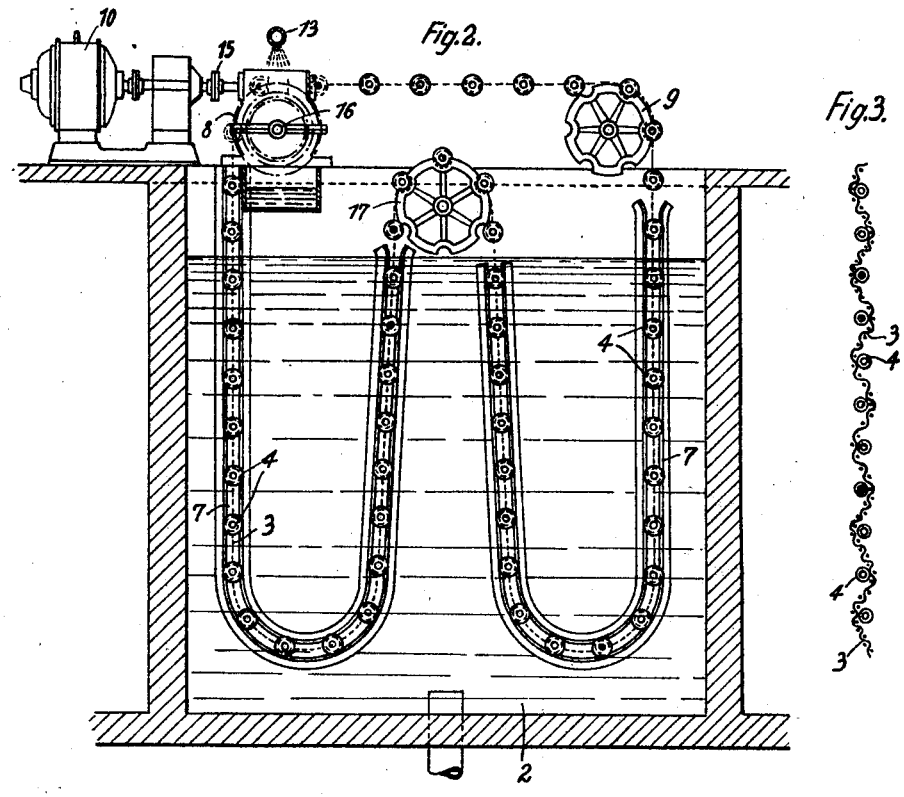
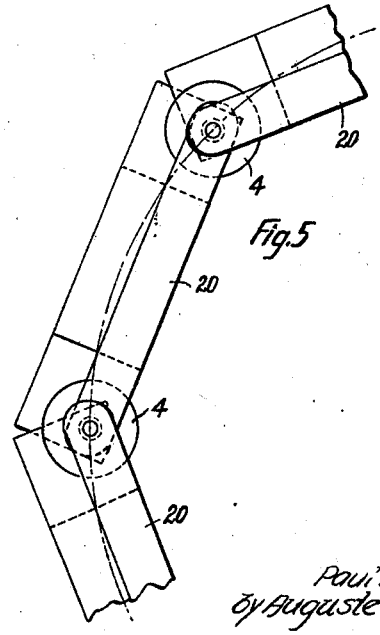
Inventor:
Paul Dittmeyer Deceased,
by Auguste Dittmyer Administratrix.

Patented Feb. 28, 1928.

1,660,436

UNITED STATES PATENT OFFICE.

PAUL DITTMEYER, DECEASED, BY AUGUSTE DITTMEYER, NÉE PFEFFER, HEIR AND ADMINISTRATRIX, OF LUDWIGSBURG, GERMANY.

APPARATUS FOR PURIFYING WITH THE AID OF AN ENDLESS SIEVE OR RAKE BAND WATER WHICH HAS BEEN POLLUTED BY FLOATING OR SINKING SUBSTANCES.

Application filed June 8, 1926, Serial No. 114,568, and in Germany October 22, 1924.

This invention relates to an apparatus for purifying with the aid of an endless sieve- or rake-band water polluted by floating or sinking substances.

The apparatus according to the invention differs from the apparatus of known type in that means are provided which pack the clear water chamber with regard to the chamber which contains the polluted water in such a manner that water can flow over from one chamber to the other only after it has passed through the sieve band, further in that the sieve band is made of special material and further by the serpentine guiding of the sieve band.

An embodiment of the invention is shown, by way of example, in the accompanying drawing, in which Fig. 1 is a longitudinal section through the apparatus.

Fig. 2 is a section on line II—II of Fig. 1.

Fig. 3 illustrates the guiding of the sieve-band and the material of the same.

Fig. 5 shows in side elevation a portion of the packing bars.

Figure 1:
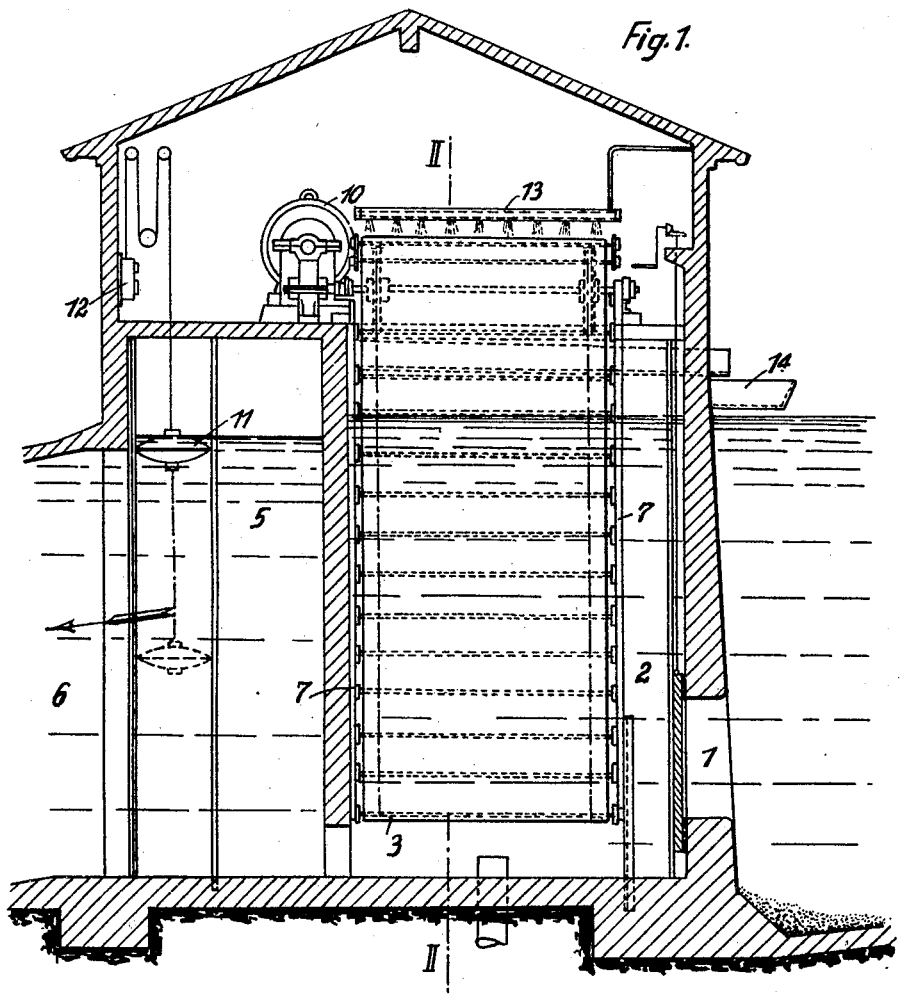
Figure 4:
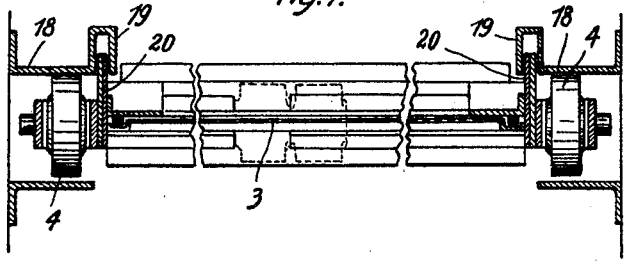
Fig. 4 illustrates in side elevation and on larger scale the packing between the clear water-chamber and the chamber containing the polluted water inside the guiding for the sieve band.

The polluted water is supplied to the apparatus through a channel 1 adapted to be shut off by a sluice and the water flows into the settling tank 2 in which the endless sieve 3 is arranged which is guided over pulleys 4. The polluted water can be admitted into the space enclosed by the sieve band or into the space which surrounds the sieve band. The purified water flows into a tank 5 and thence into the clear water channel 6. It depends on local conditions whether the polluted water is made to flow through the sieve band from the outer side to the inner side or inversely.

The pulleys 4 connected with one another at both ends by articulated chains move in lateral guidings 7 arranged in the clearing tank and guide the sieve over sprocket wheels 8, 9 mounted on the top end of the clearing tank.

The axle 16 of the sprocket wheel 8 serves to drive the sieve, it being itself intermittently revolved by an electromotor 19. If the sieve is clogged after having served some time the water level in the clean water tank 5 sinks and with it a float 11 which switches-in an electric starter 12 so that the electromotor makes the shaft 16 revolve whereby a clean portion of the sieve band is brought in front of the outflow for the clear water, the shower bath 13 being switched in at the same time.

As soon as more clear water flows out the float 11 ascends and switches off the starter 12 as soon as the float arrives at the highest position whereby the sieve is stopped. The starter 12 may be of any convenient type and of any known structure.

A friction-coupling 15 is preferably inserted into the driving gear between the motor and the driving drum 8 which coupling yields if large foreign bodies should stop the sieve. The remainder of the polluted water flows off through a trough 14.

The sieve band 3 is made of strand wire which, owing to its rough surface, effects a better purifying of the water than smooth wire. In order to ensure a better utilization of the sieve band this band is guided over guide pulleys 17 so that loops are formed. It is advisable to provide not more than three loops. The efficiency of the sieve is considerably improved by the serpentine shape and its effect is increased. The cleaning of the sieve band is also improved thereby as a shower bath can be arranged at three points e. g. above the three bends.

The guidings 7 for the conveying pulleys 4 are made of U-irons 18 having each an offset portion 19 directed towards the surface of the sieve band. Bars 20 fixed on the axles of the pulleys engage with their offset portions 19. For the offset portion 19 of the U-irons an angle iron might be substituted on the upper edge of the U-iron, the bar 20 engaging between the arm of the angle iron and the arm of the U-iron. The bars 20 ensure that the polluted water can flow into the clear water chamber only in passing through the sieve band so that all dirt particles are caught in the sieve band.

I claim:—

1. An apparatus for purifying water which is polluted by floating or sinking substances comprising in combination with a clearing tank and with a clear water tank, an endless sieve band in said clearing tank between the point at which the polluted water flows in and the point at which the purified water flows off so that the polluted water is forced to traverse said sieve band, conveyer pulleys for conveying said sieve band, guidings at either side of this sieve band in which said conveying pulleys are guided said guidings consisting of U-irons, an angular extension of each guiding directed towards said sieve band, and bars fixed on the ends of the axles of every two conveying pulleys and guided in said angular extension.

2. An apparatus for purifying water which is polluted by floating or sinking substances comprising in combination with a clearing tank and with a clear water tank, an endless sieve band made of strand wire in said clearing tank between the point at which the polluted water flows in and the point at which the purified water flows off so that the polluted water is forced to traverse said sieve band, conveyer pulleys for conveying said sieve band, guidings at either side of this sieve band in which said conveying pulleys are guided said guidings consisting of U-irons, an angular extension of each guiding directed towards said sieve band, and bars fixed on the ends of the axles of every two conveying pulleys and guided in said angular extension.

In testimony whereof I affix my signature.

AUGUSTE DITTMEYER, née PFEFFER,
*Heir and administratrix of Paul Dittmeyer, deceased.*